United States Patent [19]

Lembke

[11] Patent Number: 4,582,965
[45] Date of Patent: Apr. 15, 1986

[54] COIN TRUNK TEST SET

[75] Inventor: Robert W. Lembke, Plant City, Fla.

[73] Assignee: GTE Communication Systems Corporation, Northlake, Ill.

[21] Appl. No.: 643,587

[22] Filed: Aug. 23, 1984

[51] Int. Cl.⁴ .................................... H04M 3/26
[52] U.S. Cl. ........................ 179/175.3 R; 179/175
[58] Field of Search ............ 179/175.3 R, 175.2 R, 179/6.3 R, 84 L, 175

[56] References Cited

U.S. PATENT DOCUMENTS 4,022,987  5/1977  O'Dea ..................... 179/175.2 R

Primary Examiner—Stafford D. Schreyer
Attorney, Agent, or Firm—Gregory G. Hendricks

[57] ABSTRACT

A test set which tests coin trunk circuits for both normal and abnormal operations. A pair of light-emitting diodes monitor battery feed and reverse current. A first set of switch contacts simulate coin deposit while a second set of switch contacts connect fault, re-ring, coin deposit and coin return monitoring lamps and circuit paths to the coin trunk circuit.

18 Claims, 1 Drawing Figure

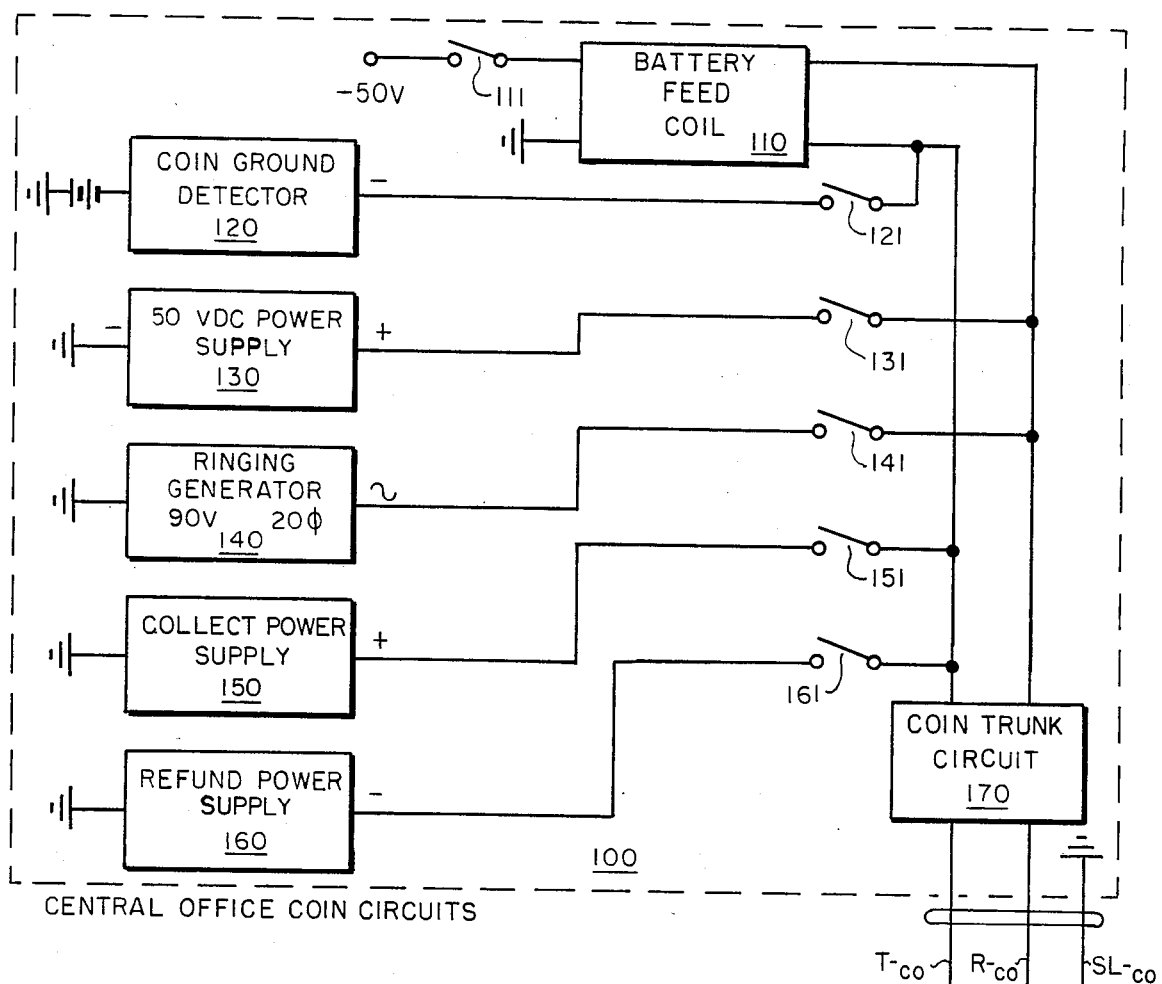
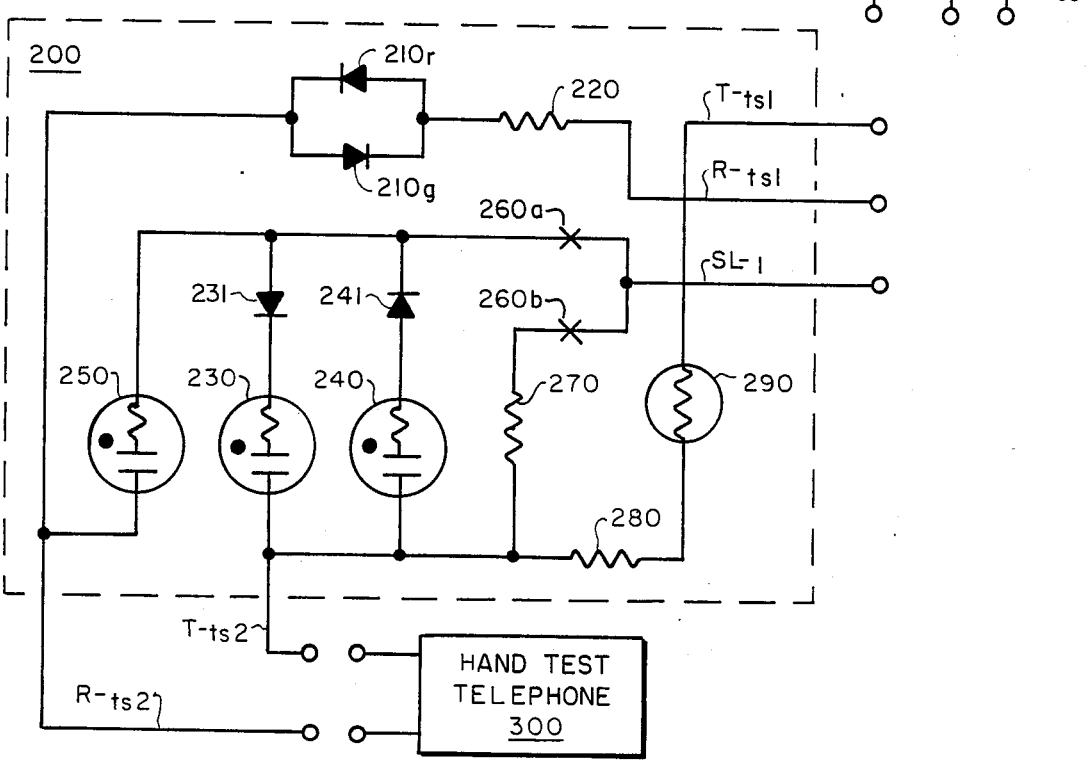

COIN TRUNK TEST SET

FIELD OF THE INVENTION

The present invention relates to test sets and more particularly to equipment for testing coin trunk circuits.

BACKGROUND OF THE INVENTION

The typical method of testing a coin trunk circuit is to connect a coin telephone to the trunk circuit, originate various coin and non-coin telephone calls and monitor the central office response to such call originations. However, use of coin telephones for coin trunk testing is cumbersome, inefficient and can result in inaccurate test results.

SUMMARY OF THE INVENTION

In accordance with the present invention, a coin trunk test set is provided for use with both a hand test telephone having first and second terminals, and central office coin circuits including a battery feed source, a reverse battery source, a ringing generator, a coin collect power supply, a coin refund power supply, a coin ground detector and a coin trunk circuit having first and second terminals.

The coin trunk test set includes first sensible indicating means connected between the first terminal of the coin trunk circuit and the first terminal of the hand test telephone. The second terminal of the hand test telephone is connected to the second terminal of the coin trunk circuit.

The first sensible indicating means is operative in response to connection of the battery feed source to the coin trunk circuit to provide a path for battery feed current. The first sensible indicating means is operative in response to the battery feed current to provide a steady first sensible signal of a first characteristic. The first soluble indicating means is further operative in response to connection of the reverse battery source to the coin trunk circuit to provide a path for reverse battery current. The first sensible indicating means is operative in response to the reverse battery current to provide a steady first sensible signal of a second characteristic.

The coin trunk test set further includes second sensible indicating means, connected to the first terminal of the hand test telephone, and first switching means, connected between the second sensible indicating means and ground.

The first switching means is operative to electrically connect the second sensible indicating means to ground. The second sensible indicating means is operative in response to connection of the ringing generator to the coin trunk circuit to provide a path for ringing current. The second sensible indicating means is operative in response to the ringing current to provide a periodic second sensible signal. The first sensible indicating means is also operative to provide a path for the ringing current and it is operative in response to the ringing current to provide periodic first sensible signals of first and second characteristics.

The coin trunk test set further includes second switching means connected between the second terminal of the hand test telephone and ground. The second switching means is operative to electrically connect the second terminal of the hand test telephone and the coin trunk circuit to ground.

The coin trunk test set further includes third sensible indicating means connected between the second terminal of the hand test telephone and the first switching means. The first switching means is further operative to connect the third sensible indicating means to ground. The third sensible indicating means is further operative in response to connection of the coin collector power supply to the coin trunk circuit in a first arrangement to provide a path for coin collect current. The third sensible indicating means is operative in response to the coin collect current to provide a third sensible signal.

The coin trunk test set further includes fourth sensible indicating means connected between the second terminal of the hand test telephone and the first switching means. The first switching measn is further operative to connect the fourth sensible indicating means to ground. The fourth sensible indicating means is further operative in response to connection of the coin return power supply to the coin trunk circuit in a first arrangement to provide a path for the coin return current. The fourth sensible indicating means is operative in response to the coin return current to provide a fourth sensible signal.

The first and second sensible indicating means are operative in response to connection of the coin collect power supply to the coin trunk circuit in a second arrangement to provide a path for coin collect current. The first sensible indicating means is operative in response to the coin collect current to provide the steady first sensible signal of a second characteristic, and the second sensible indicating means is operative in response to the coin collect current to provide a steady second sensible signal. The first and second sensible indicting means are operative in response to connection of the coin return power supply to the coin trunk circuit in a second arrangement to provide a path for coin refund current. The first sensible indicating means is oeprative in response to the coin refund current to provide the steady first sensible signal.

DESCRIPTION OF THE DRAWING

The single FIGURE of the accompanying drawing is a schematic diagram of the coin trunk test set of the present invention.

DESCRIPTION OF THE PREFERRED EMBODIMENT

Referring now to the accompanying drawing, the coin trunk test set of the present invention is shown as being connectable between hand test telephone 300 and central office circuits 100.

Central office coin circuits 100 include battery feed coil 110, coin ground detector 120, 50 V DC power supply 130, ringing generator 140, coin collect power supply 150, coin refund power supply 160 and coin trunk circuit 170. This trunk circuit is connected between battery feed coil 110 and tip and ring leads T-co and R-co, respectively. Coin trunk circuit 120 is also connectable to coin ground detector 170, 50 V DC power supply 130, ringing generator 140, coin collect power supply 150 and coin refund power supply 160.

Coin trunk test set 200 includes the parallel combination of light emitting diodes (LED) 210r and 210g connected to resistor 220 which is further connected to ring lead R-ts1. The parallel combination of line LEDS 210r and 210g is further connected to ring lead R-ts2. Coin refund lamp 230 is connected to the cathode of diode 231 and coin collect lamp 240 is connected to the anode of diode 241. The cathode of this diode is connected to the junction of fault and re-ring lamp 250, the anode of diode 231 and coin/non-coin switch contact 260a. Fault and re-ring lamp 250 is further connected to ring lead R-ts2. Lamps 230 and 240 are further connected to each other, to tip lead T-ts2 and the junction of resistors 270 and 280. Resistor 270 is further connected to coin/non-coin switch contacts 260b which are further connected to coin/non-coin switch contacts 260a and sleeve lead SL-1. Resistor 280 is further connected to thermistor 290 which is connected to tip lead T-ts1.

The coin trunk test set is used to test the coin trunk for detection of coin deposit, application of line current, application of coin refund and coin collect voltages, application of coin voltage on both tip and ring leads, application of ringing current and application of 50 V DC touch call disabling voltage.

Battery feed coil 110, ringing generator 140, coin ground detector 120, 50 V DC power supply 130, coin collect power supply 150, coin refund power supply 160, coin circuit 170 and hand test telephone 300 are all old and well known.

In order to use the coin trunk test set, it is connected between hand test telephone 300 and the central office coin circuits 100. Then, the tip, ring and sleeve leads, T-ts1, R-ts1 and SL-1, of the coin trunk test set are connected to the tip, ring and sleeve leads, T-co, R-co and SL-co, respectively, of the central office. Sleeve lead SL-co is further connected to ground. Also, coin test set tip and ring leads, T-ts2 and R-ts2, are connected to hand test telephone 300 and switch 111 is closed to connect battery feed coil 110 to −50 V.

The test person then closes a talk-monitor switch on hand test telephone 300 to initiate testing of the coin trunk. Current then flows from battery feed coil 110, through coin trunk circuit 170, coin trunk test set 200 and hand test telephone 300.

Negative current flows into coin trunk test set 200 via ring lead R-ts1 and then through green line LED 210g. It then passes through hand test telephone 300 and returns to ground via tip lead T-ts1 and T-ts2, resistor 280, thermistor 290, tip lead T-ts1 and T-co, coin trunk circuit 170 and battery feed coil 110. Thus green line LED 210g is lit in reponse to line current flowing through coin trunk 170, coin trunk test set 200 and hand test telephone 300.

Coin/non-coin switch contacts 260a and 260b are initially in the non-coin or open position. Hand test telephone 300 is then used to dial a coin-free call such as 911, 800 WATS or an operator call. Such a call will be completed if the coin trunk circuits are operating properly.

When a coin-required call is initiated, e.g., a seven digit called number, the central office must be provided with an indication that the required base rate coins have been deposited. The central office interprets a resistive ground on tip lead T-co as the indication that the base rate coins have been deposited. Switch contacts 260a and b are closed in order to provide this resistive ground on tip lead T-co.

The central office then closes switch 121 and opens switch 111. When switch 111 opens, battery feed coil 110 is disconnected from the −50 V DC battery feed and green line LED 210g is extinguished. Current then flows from the battery supply connected to coin ground detector 120, through coin ground detector 120, closed switch 121, tip leads T-co and T-ts1, thermistor 290, and resistors 270 and 280. Current then returns to ground via closed contact 260b and sleeve leads SL-1 and SL-co.

The coin-required call is then dialed with hand test telephone 300. If coin ground detector 120 is operating properly, the coin-required call will be processed. Coin ground detector 120 is then disconnected from coin trunk circuit 170.

Upon termination of the coin-required call, the central office applies coin-collect or coin-refund power to the coin trunk test set, depending on whether the call was chargeable or nonchargeable, respectively.

For a chargeable call, coin collect power supply 150 is connected to tip lead T-co via switch 151 and coin trunk circuit 170. This +110 V DC power supply causes positive current to flow to coin trunk test set 200 via coin trunk circuit 170 and the T-co and T-ts1 leads. This current then flows through coin collect lamp 240 via resistor 280 and thermistor 290. This current then returns to ground via diode 241, closed coin contact 260a and sleeve leads SL-1 and SL-co. Coin collect lamp 240 then flows as a result of such current flow, and it thus provides a visual indication of the validity of the coin collect operation.

Similarly, for a nonchargeable call, coin refund power supply 160 is connected to tip lead T-co via switch 161 and coin trunk circuit 170. This −110 V DC power supply causes negative current to flow to coin trunk test set 200 via coin trunk circuit 170 and the T-co and T-ts1 leads. This current then flows through coin refund lamp 230 via resistor 280 and thermistor 290. This current then returns to ground via diode 231, closed coin contact 260a and sleeve leads SL-1 and SL-co. Coin refund lamp 230 then flows as a result of such current flow and it thus provides a visual indication of the validity of the coin refund operation.

If coin collect or coin refund battery were to appear on both the tip and ring leads, a fault condition would exist. Under such conditions, current would flow to coin trunk test set 200 via coin trunk circuit 170 and both tip lead pair T-co/T-ts1 and ring lead pair R-co/R-ts1. If coin refund power supply 160 is so connected to both the tip and ring leads, negative current flows through green line LED 210g via resistor 220 and ring lead R-ts1. This negative current then flows through fault and re-ring lamp 250 and returns to ground via closed coin contact 260a and sleeve leads SL-1 and SL-co. Under such a fault condition, negative current also flows through refund lamp 230 via resistor 280, thermistor 290 and tip lead T-ts1. This negative current then returns to ground via diode 231, closed coin contact 260a and sleeve leads SL-1 and SL-co. Thus the coin refund lamp is lit in addition to the fault and re-ring lamp when coin refund battery appears on both the tip and ring leads.

Similarly, if coin collect power supply 150 is connected to both the tip and ring leads, positive current flows through red line LED 210r via resistor 220 and ring lead R-ts1. This positive current then flows through fault and re-ring lamp 250 and returns to ground via closed coin contact 260a and sleeve leads SL-1 and SL-co. Under this fault condition, positive current also flows through coin collect lamp 240 via resistor 280, thermistor 290 and tip lead T-ts1. This positive current then returns to ground via diode 241, closed coin contact 260a and sleeve leads SL-1 and SL-co. Thus the coin collect lamp is lit in addition to the falt and re-ring lamp when coin collect battery appears on both the tip and ring leads.

When a touch-call telephone is connected to the coin trunk circuit, the central office disables the touch-call pad during the time that an operator is also connected. This disablement is done to prevent fraudulent signaling via the touch-call pad. In order to disable the touch-call pad, the central office disconnects the −50 V DC battery feed from battery feed coil 110 and connects +50 V DC power supply 130 to coin trunk circuit 170 via switch 131. This +50 V DC potential then appears on ring lead R-co. Thus the voltage that normally appears on this lead is reversed in order to disable the touch-call pad and thereby prevent fraudulent signalling.

This voltage reversal is also tested by coin trunk test set 200. The +50 V DC potential on ring lead R-co causes current to flow through red line LED 210r via resistor 220 and ring lead R-ts1. This current then flows through hand test telephone 300 via tip and ring leads T-ts2 and R-ts2, and returns to ground via resistor 280, thermistor 290, tip lead pair T-ts1 and T-co, coin trunk circuit 170 and battery feed coil 110. Thus red line LED 210r glows in response to detection of the touch call pad disabling voltage from +50 V DC power supply 130.

When the central office re-rings a calling coin telephone, it connects ringing generator 140 to coin trunk circuit 170 by operating switch 141. This ringing generator provides a 90 volt, 20 cycle, AC signal which then appears on ring lead pair R-co and R-ts1. Current then alternately flows through red line LED 210r and green line LED 210g via resistor 220. This alternating current then flows through fault and re-ring lamp 250 and returns to ground via closed coin switch contacts 260a and sleeve lead pair SL-1 and SL-co. Thus fault and re-ring lamp 250 and red and green line LEDs, 210r and 210g, flash at the ringing current frequency in response to detection of re-ring current.

Thus the coin trunk test set of the present invention provides an efficient means of testing the central office coin circuits, including the battery feed coil, the coin ground detector, the touch-call pad reverse voltage, the ringing generator, the coin collect and coin refund power supplies and the coin trunk circuit.

It will be obvious to those skilled in the art that numerous modifications of the present invention can be made without departing from the spirit of the invention which shall be limited only by the scope of the claims appended hereto.

What is claimed is:

1. A coin trunk test set for use with a hand test telephone having first and second terminals, and central office coin circuits including a battery feed source, a reverse battery source, a ringing generator, and a coin trunk circuit having first and second terminals, said coin trunk test set comprising:
    first sensible indicating means connected between the first terminal of said coin trunk circuit and the first terminal of said hand test telephone; the second terminal of said hand test telephone being connected to said second terminal of said coin trunk circuit;
    said first sensible indicating means being operative in response to connection of said battery feed source to said coin trunk circuit to provide a path for battery feed current, said first sensible indicating means being operative in response to said battery feed current to provide a steady first sensible signal of a first characteristic;
    said first sensible indicating means being further operative in response to connection of said reverse battery source to said coin trunk circuit to provide a path for reverse battery current, said first sensible indicating means being operative in response to said reverse battery current to provide a steady first sensible signal of a second characteristic;
    said sensible indicating means connected to said first terminal of said hand test telephone; and
    first switching means connected between said second sensible indicating means and ground;
    said first switching means being operative to electrically connect said second sensible indicating means to ground;
    said second sensible indicating means being operative in response to connection of said ringing generator to said coin trunk circuit to provide a path for ringing current, said second sensible indicating means being operative in response to said ringing current to provide a periodic second sensible signal;
    said first sensible indicating means being also operative to provide a path for said ringing current and being operative in response to said ringing current to provide periodic first sensible signals of first and second characteristics.

2. A coin trunk test set as claimed in claim 1, wherein said central office coin circuits further include a coin collect power supply:
    said first and second sensible indicating means being operative in response to connection of said coin collect power supply to said coin trunk circuit in a second arrangement to provide a path for coin collect current; said first sensible indicating means being operative in response to said coin collect current to provide said steady first sensible signal of a second characteristic, and said second sensible indicting means being operative in response to said coin collect current to provide a steady second sensible signal.

3. A coin trunk test set as claimed in claim 1, wherein said central office coin circuits further include a coin return power supply:
    said first and second sensible indicating means being operative in response to connection of said coin return power supply to said coin trunk circuit in a second arrangement to provide a path for coin return current;
    said first sensible indicating means being operative in response to said coin return current to provide said steady first sensible signal of a first characteristic, and said second sensible indicating means being operative in response to said coin return current to provide said steady second sensible signal.

4. A coin trunk test set as claimed in claim 1, wherein said second sensible indicating means comprises a voltage threshhold detecting visual indicating device.

5. A coin trunk test set as claimed in claim 4, wherein said voltage threshhold detecting visual indicating device comprises a neon lamp.

6. A coin trunk test set as claimed in claim 1, wherein there is further included, second switching means connected between said second terminal of said hand test telephone and ground; said second switching means being operative to electrically connect said second terminal of said hand test telephone and said coin trunk circuit to ground.

7. A coin trunk test set as claimed in claim 6, wherein there is further included a resistor connected between said second switching means and said second terminal of said hand test telephone.

8. A coin trunk test set as claimed in claim 1, wherein said central office coin circuits further include a coin collect power supply, said coin trunk test set further comprising:

third sensible indicating means connected between said second terminal of said hand test telephone and said first switching means, said first switching means being further operative to connect said third sensible indicating means to ground;

said third sensible indicating means being further operative in response to connection of said coin collect power supply to said coin trunk circuit in a first arrangement to provide a path for coin collect current, said third sensible indicating means being operative in response to said coin collect current to provide a third sensible signal.

9. A coin trunk test set as claimed in claim 8, wherein said third sensible indicating means comprises a unidirectional voltage threshhold detecting visual indicating device.

10. A coin trunk test set as claimed in claim 9, wherein said unidirectional voltage threshhold detecting visual indicating device comprises a neon lamp connected in series with a diode.

11. A coin trunk test set as claimed in claim 1, wherein said central office coin circuits further include a coin return power supply, said coin trunk test set further comprising:

fourth sensible indicating means connected between said second terminal of said hand test telephone and said first switching means, said first switching means being further operative to connect said fourth sensible indicating means to ground;

said fourth sensible indicating means being further operative in response to connection of said coin return power supply to said coin trunk circuit in a first arrangement to provide a path for said coin return current, said fourth sensible indicating means being operative in response to said coin return current to provide a fourth sensible signal.

12. A coin trunk test as claimed in claim 11, wherein said fourth sensible indicating means comprises a unidirectional voltage threshhold detecting visual indicating device.

13. A coin trunk test set as claimed in claim 12, wherein said unidirectional voltage threshhold detecting visual indicating device comprises a neon lamp connected in series with a diode.

14. A coin trunk test set as claimed in claim 1, wherein said first sensible indicating means comprises a pair of parallel and oppositely poled unidirectional visual indicating devices.

15. A coin trunk test set as claimed in claim 14, wherein each of said visual indicating devices comprises a light emitting diode.

16. A coin trunk test set as claimed in claim 1, wherein there is further included a resistor connected between said first sensible indicating means and said first terminal of said coin trunk circuit.

17. A coin trunk test set as claimed in claim 1, wherein there is further included a thermistor connected between said second terminal of said hand test telephone and said coin trunk circuit.

18. A coin trunk test set as claimed in claim 1, wherein there is further included a resistor connected between said second terminal of said hand test telephone and said coin trunk circuit.

* * * * *